United States Patent [19]
Vincent

[11] 3,967,293
[45] June 29, 1976

[54] DETENT FOR LOW MASS OBJECT
[76] Inventor: Andrew W. Vincent, 65 Aberdeen St., Rochester, N.Y. 14611
[22] Filed: May 9, 1975
[21] Appl. No.: 576,032

[52] U.S. Cl. .............................................. 354/252
[51] Int. Cl.² .......................................... G03B 9/02
[58] Field of Search ........................... 354/234, 252

[56] References Cited
UNITED STATES PATENTS

| | | | |
|---|---|---|---|
| 3,391,627 | 7/1968 | Leuschke ...................... | 354/252 X |
| 3,470,808 | 10/1969 | Bloemendoal et al. ............. | 354/234 |
| 3,646,870 | 3/1972 | Koleff et al. ....................... | 354/252 |
| 3,664,251 | 5/1972 | Vincent ............................. | 354/234 |
| 3,886,572 | 5/1972 | Ouda et al. ....................... | 354/234 |

*Primary Examiner*—Joseph F. Peters, Jr.
*Attorney, Agent, or Firm*—Hoffman Stone

[57] ABSTRACT

A detent of low mass consisting of a wire bent to form a torsion spring with laterally extending arms shaped for abutment with the moving object to be stopped. The tips of the arms are covered with a compressible, resilient material that absorbs the initial shock of impact until the pre-load is taken up and the arm begins to move.

3 Claims, 4 Drawing Figures

3,967,293

DETENT FOR LOW MASS OBJECT

BRIEF DESCRIPTION

This invention relates to a novel detent for arresting the motion of a body having relatively little mass.

The invention arose in connection with efforts to improve the durability of an electromagnetically operated photographic shutter of the kind described in U.S. Pat. No. 3,664,251, issued May 23, 1972 to the present inventor, and will be described herein as applied to a shutter of that kind. It is contemplated, however, that the principle of the invention will be found useful in many other applications where it is desired to arrest the motion of an object of relatively small mass smoothly and with a minimum of so-called bounce and return motion.

Shutters of the kind described and claimed in the above-identified patent have met with satisfying commercial success, yet there has been a demand for better durability than the 50,000 cycle minimum life expectancy heretofore obtainable in those shutters having a 1 inch diameter aperture, and without sacrifice of any of the advantageous operating characteristics such as, for example, high speed operation, lack of bounce at the ends of the motion, and full controllability and predictability of operation.

A shutter of the kind referred to includes a pair of blades of very thin material such as stainless steel about one thousandth of an inch thick carried by respective pivoted arms and thereby swingable between a closed position in which the blades cover the main aperture and an open position in which they are drawn aside from the aperture. The arms are in the form of beams of triangular cross-section, the web portions being made, also, of thin and fragile material such as 0.001 inch stainless steel. As shown in the patent, detents of relatively heavy material in the form of leaf springs are arranged for arresting the motion of the blades at the ends of their travel by abutting engagement with the beams. The beams engage angled surfaces of the detents, and, with a cam-like action, flex the detents laterally away from the plane of travel of the beams. Failure occurs when the lateral deflection of the detent exceeds the lateral dimension of the beam allowing the beam to pass by the detent and become trapped beyond it. Sometimes, also, the beams simply fracture and break.

Life expectancy of 50,000 cycles for the shutter having an aperture of one inch appears to be satisfactory for many uses, but it nevertheless became desirable to improve the life. The actual underlying causes of the prior failures are not known, but in the development of the invention the approach taken was to attempt to design a detent of low mass. It was recognized that the detent as shown in the patent was of very much greater mass than the blade and beam assembly which constitutes the moving body to be stopped, and it was thought that the mass of the detent somehow created a dynamic mis-match that imposed more strain on the beam than would a detent of low mass, and possibly also brought about excessive flexing of the detent itself.

The minimum life expectancy of shutters of one inch aperture equipped with the detents of the present invention is over one million cycles, a very substantial and surprising increase over the life with the older detent. The detent of the invention is formed by bending a single piece of spring wire to form a torsion spring integrally connected to a laterally extending arm shaped to engage the moving body. The spring normally rests in a pre-loaded condition, and the engagement portion of the arm is covered with a compressible, resilient material that appears to absorb the shock of initial impact up to the point where the pre-load is overcome, after which the arm is deflected until the body stops. Thereafter, the arm returns the body to its proper terminal position. Since it is desired to have one detent for arresting the opening motion of the shutter and another one for the closing motion, both of the detents are formed of the same piece of spring wire and the torsion spring is in the form of a hairpin, both legs of which twist in response to displacement of either one of the engagement arms.

DETAILED DESCRIPTION

A presently preferred embodiment of the invention will now be described in connection with the drawing, wherein.

So far as applicable, in describing the shutter shown the same reference characters will be used as in the prior patent.

Figure 1:
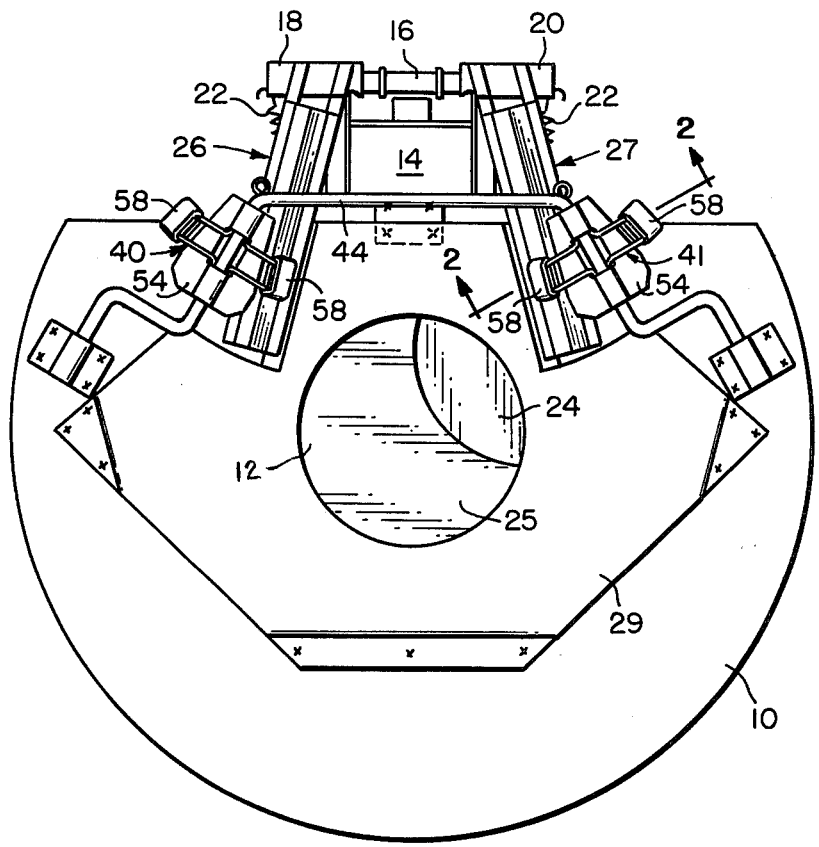
FIG. 1 is a front elevational view of an electromagnetically actuatable photographic shutter including detents according to the invention.
Figure 3:
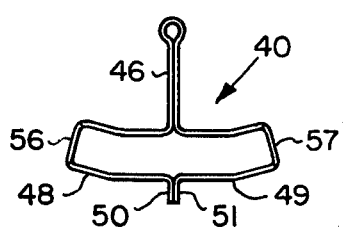
FIG. 3 is a front elevational view of the wire portion of the detent.
Figure 2:
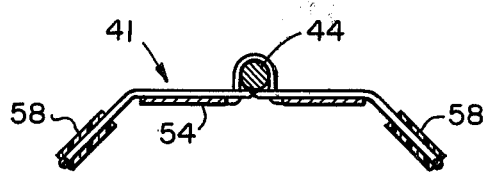
FIG. 2 is a sectional view of a detent according to the invention taken along the line 2—2 of FIG. 1.
Figure 4:
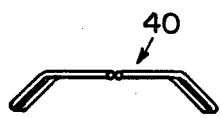
FIG. 4 is a bottom view of the wire portion shown in FIG. 3.

The shutter includes a main mounting plate 10 having a central aperture 12. An electromagnetic actuator 14 is mounted upon the upper edge of the plate 10 and includes an armature 16 which engages laterally extending levers 18 and 20, which are pivoted on floating pivots (not separately designated) and carry the respective beams 26 and 27. The blades 24 and 25 are fixed as by welding to the beams and are movable between a closed position and an open position.

Further details of the construction of the shutter itself may be had from an inspection of the above-referenced patent. The present description will be directed to the novel detent construction that has so dramatically increased the minimum life expectancy of the one inch shutter.

The two sets of detents 40 and 41 shown are identical, and, accordingly, only one need be described in detail. It is a relatively simple device consisting of a single piece of spring wire such as piano wire say about 0.022 inch thick and round in cross-section, carried by a relatively heavy and rigid support wire 44 which is fixed as rigidly as possible to the main plate 10. Flexure of the support wire 44 is minimized, although, of course, it cannot be altogether avoided.

The detent 40 includes a central, hairpin portion 46 which constitutes the torsion spring and terminates at the tips of the hairpin in bends of approximately 90° which join it to the upper portions of the laterally extending, generally U-shaped arms 48 and 49. Pivot extensions 50 and 51, respectively, are bent axially from the lower reaches of the arms 48 and 49 and lie in coaxial alignment with the hairpin portion 46.

The detent 40 is mounted upon a pre-load plate 54, which is securely fixed to the support wire 44 and somewhat resembles a delta shaped wing with a central semi-tubular bend that fits over the support wire 44 and contains the hairpin portion 46 and pivot tip portions 50 and 51 of the detent itself.

The outer portions of the U-shaped arms 48 and 49 are bent rearwardly, as viewed in FIG. 1, to lie essentially parallel to the inclined walls of the beam 26 when they are engaged by the beam, and these outer portions 56 and 57 are covered with a compressible, resilient material such as polyurethane, which may be in the form of a short length of commercially available tubing having a wall thickness of about 0.30 inch.

In operation the detent of the invention appears to operate much as does the detent shown in the prior patent, except that due to its much lower mass it does not appear to acquire significant momentum during its travel in deflection, but instead maintains continuous pressure against the beam, holding it flat upon the base plate 10 and keeping it from twisting. Because of this characteristic the deceleration of the beam is gentler than heretofore, and a significantly greater travel can be tolerated during the arresting process without danger of the beam's passing under the detent and becoming trapped beyond it.

Upon initial impact of the beam 26, the compressible material is compressed and absorbs the incoming energy until the pre-load is taken up. Thereafter, the arm 48 or 49, whichever is engaged depending upon the direction of motion of the beam, is deflected forwardly until the beam is stopped. It then returns the beam to its proper terminal position maintaining a balance against the motion forces acting on the beam, either the drive of the actuator 14 or the return force of the return springs 22.

The diameter of the wire of which the detent 40 is made, the length of the torsion spring portion, and the degree of pre-load appear to be important factors in the maximization of the life of the shutter, but a very great improvement in life has been found to occur over a wide range of these variables. It is believed that the principal factor in the improvement lies in the greatly reduced mass of the detent relative to the previously used, relatively heavy detent. The mass of the present detent is of the same order of magnitude as the mass of the blade and beam assembly to be stopped, or perhaps a little less than the assembly. This seems to impose less of shock on the beam. Also, the high efficiency of the torsion spring relative to the leaf type of spring in the prior detent is believed to enhance the life and uniformity of action over that life of the detent itself so that the spring does not weaken and eventually allow the beam to pass it.

What is claimed is:

1. A detent for arresting the motion of a body of relatively small mass comprising a single piece of spring wire having a portion arranged as a torsion spring, an arm portion extending outwardly from said spring portion and shaped for abutting engagement by the body to be stopped and to be driven by that engagement in a direction to torque said spring portion, said arm portion being generally U-shaped and including a tip at the end of its leg opposite from said spring portion bent into axial alignment with said spring portion, and means for mounting said detent adjacent to the path of travel of the body to be arrested and for pre-loading said spring portion.

2. A detent according to claim 1 wherein said torsion spring is U-shaped, and the detent has two arms generally facing each other, one being integrally joined to the end of one leg of said torsion spring and the other integrally joined to the end of the other leg, said arms extending in generally opposite respective directions from said torsion spring and each having a tip portion bent into generally coaxial alignment with the torsion spring.

3. An electromagnetically actuatable photographic shutter of the kind having a base plate, an electromagnetic actuator mounted on said base plate, a pair of leaf-like blades lying on said base plate, a pair of beams rigidly fixed to said blades and connected to said actuator for movement thereby, and detent means for arresting the motion of said beams at the ends of their travel, said detent means comprising, for each beam, a spring wire bent to form a hairpin-shaped torsion spring integrally connected with a pair of opposed laterally extending, U-shaped abutment arms, means mounting said spring wire to said base plate with end portions of said abutment arms positioned approximately at the ends of travel of the beams for interference engagement therewith, the end portions of said arms being covered with a compressible, resilient material, and pre-load means for preloading said hairpin torsion spring.

* * * * *